United States Patent Office 3,501,500
Patented Mar. 17, 1970

---

3,501,500
PHOSPHORUS-CONTAINING γ-VALEROLACTONES
Arthur John Floyd and Roy Cyril Hinton, Bracknell, England, assignors to Imperial Chemical Industries Limited, London, England, a corporation of Great Britain
No Drawing. Filed Apr. 16, 1962, Ser. No. 187,925
Claims priority, application Great Britain, Apr. 26, 1961, 15,097/61
Int. Cl. C07f 9/02
U.S. Cl. 260—343.6        4 Claims This invention relates to organo-phosphorus compounds having pesticidal activity, to a process of making them and to pesticidal compositions containing them.

The invention consists in one aspect of lactone derivatives of a phosphorus thiolic acid, having a sulphur atom connecting the lactone ring at its β-position to the phosphorus atom of the said acid. The phosphorus thiolic acid can be, for example, a phosphorothiolic acid, for instance O:O-diethyl phosphorothiolic acid, a phosphorodithioic acid, for instance O:O-dimethyl phosphorodithioic acid; an alkylphosphonothiolic acid, for instance O-ethyl methylphosphonothiolic acid; an alkylphosphonodithioic acid, for instance O-methyl methylphosphonodithioic acid, or a dialkylphosphinotholic acid, for instance diethylphosphinodithioic acid. The lactone ring can be derived, for example, from β-angelica lactone, 3-acetyl-4,6,6-trimethyl-3,4,5,6-tetrahydro-2-pyrone or 2-oxo-3-acetyl-4,5-dimethyl-2,3,4,5-tetrahydrofuran.

Compounds included in the invention are those of the formula:

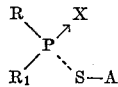

where R is an alkyl, alkoxy or alkylmercapto radical having 1–6 carbon atoms; $R_1$ is an alkyl, alkoxy, alkylmercapto, alkylamino, or dialkylamino radical having 1–6 carbon atoms; X is an atom of oxygen or sulphur; and A is a gamma or delta lactone residue attached at its β-carbon atom to the sulphur atom depicted. Where the lactone ring residue is one derived from a gamma lactone it can be, for example, a gamma-valerolactone residue.

Compounds with which the invention is particularly concerned are compounds of the formula:

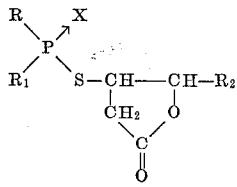

where R, $R_1$ and X have the meanings given above and $R_2$ is a hydrogen atom or an alkyl radical having 1–4 carbon atoms, for example methyl or ethyl.

Other compounds of the invention are those of the formula:

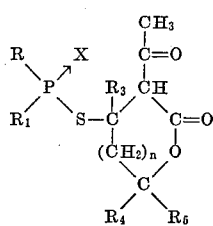

where R, $R_1$ and X have the meanings given above, $R_3$ and $R_4$ are alkyl radicals of 1–4 carbon atoms, $R_5$ is a hydrogen atom or an alkyl radical of 1–4 carbon atoms, and $n$ is 0 or 1. $R_3$, $R_4$ and $R_5$ which can be the same or different, can be for example, methyl radicals.

In the compounds of the invention R and $R_1$, which can be the same or different, can be for example, radicals having 1–4 and particularly one or two carbon atoms. For example, R and $R_1$ can both be methyl, ethyl, methoxy or ethoxy radicals. Alternatively, R can be a methyl radical and $R_1$ can be a methoxy, ethoxy, propoxy, or butoxy radical.

The compounds of the invention can be prepared by a process in which a compound of the formula:

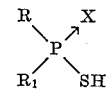

where R, $R_1$ and X have the meanings given to them above, is reacted with an appropriate lactone having a double bond between its α and β carbon atoms. For example, where the compound to be prepared is one having a gamma lacton ring, the lactone reactant can be one having the formula:

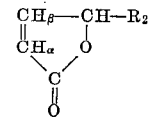

where $R_2$ has the meaning given to it above. Where in the structural formula shown immediately above the group $R_2$ is a methyl radical the compound is commonly called β-angelica lactone, that is 5-methyl-2-oxo-2,5-dihydrofuran.

To obtain really satisfactory results the process should be carried out using a small amount of a suitable base as catalyst. Suitable bases include organic bases, for instance amines such as piperidine and pyridine; and inorganic bases such as alkali metal hydroxides, for instance sodium hydroxide. In general it is desirable to have in the mixture of reactants a small amount of a suitable antioxidant, for example hydroquinone, to prevent accidental oxidation of the unsaturated lactone reactant.

The organo-phosphorus compounds of the invention show pesticidal activity towards aphids. Some of the dithio compounds, that is compounds in which the group X is a sulphur atom, show specific activity towards aphids combined with a low mammalian toxicity; some of the thiolates, that is compounds where X is an oxygen atom, show more general pesticidal activity.

Thus, the invention also includes pesticidal compositions comprising as active ingredient an organo-phosphorus compound of this invention. The active ingredient can be in admixture with a carrier or an inert diluent or with a suitable second pesticidal substance. The pesticidal compositions can, for example, be liquid compositions in which the active ingredient is dissolved or dispersed in water or a suitably non-phytotoxic organic liquid.

The compounds of the invention are, in general, only slightly soluble in water, but they are readily soluble in certain organic solvents. This fact can be utilised in preparing aqueous compositions of compounds of the invention, by dissolving the compound in a small quantity of a suitable organic solvent, for instance methanol, tetrahydrofurfuryl alcohol, diacetone alcohol or β-ethoxyethanol, and dispersing the resulting solution in water, for example with the aid of a dispersing agent.

Pesticidal compositions of this invention can alternatively be in the form of powders in which the active ingredient is in admixture with a powder diluent, for example china clay, gypsum, bentonite or kieselguhr. The pesticidal compositions, whether liquid or powder, can if desired contain a wetting or dispersing agent, or a corrosion inhibitor.

The invention also includes a method of combating insect pests, in which the pests or plants susceptible to attack by them or seeds from which such plants are to be grown, are treated with an organo-phosphorus compound of this invention or a pesticidal composition containing it.

The invention is illustrated by the following examples.

EXAMPLE 1

This example describes the preparation of β-diethoxy phosphinothioylthio-γ-valerolactone.

O:O-diethyl phosphorodithioic acid (27.9 g.) was added slowly to a mixture of β-angelica lactone (14.7 g.), two drops of piperidine and a few crystals of hydroquinone. The reaction mixture was heated to 50° C. and then maintained at a temperature in the range 50–60° C. for 8 days, at the end of which period it was cooled to room temperature and dissolved in benzene (250 ml.). The resulting solution was washed with aqueous sodium bicarbonate solution (25 ml.), next with two successive 25 ml. amounts of water, dried over magnesium sulphate; and the benzene was then removed by distillation in vacuo to yield crude β - diethoxyphosphinothioylthio - γ - valerolactone, $n_D^{21}$ 1.5179. This material was purified by being heated up to 150° C. under 0.02 mm. pressure of mercury and discarding the fraction distilling off under these conditions. The purified product thus obtained was a liquid having a refractive index at $n_D^{21}$ of 1.5199.

EXAMPLES 2–13

Several other lactone derivatives of phosphorus acids (included below as Examples 2–13) have been prepared by the general process of Example 1, but using the appropriate phosphorus thiolic acid in place of the O:O-diethyl phosphorodithioic acid used in Example 1.

These phosphorus acids are all believed to have a structure corresponding to the formula:

$$\begin{array}{c} R \diagdown \quad \nearrow X \\ P \\ R_1 \diagup \quad \diagdown SH \end{array}$$

and the substances obtained as products of the examples are believed to have the corresponding formula:

$$\begin{array}{c} R \diagdown \quad \nearrow X \\ P \\ R_1 \diagup \quad \diagdown S-CH-CH-CH_3 \\ \qquad \qquad \quad | \qquad / \\ \qquad \qquad \quad CH_2 \quad O \\ \qquad \qquad \quad \diagdown \diagup \\ \qquad \qquad \quad\;\; C \\ \qquad \qquad \quad\;\; \| \\ \qquad \qquad \quad\;\; O \end{array}$$

where R is a lower alkyl or alkoxy radical, $R_1$ is a lower alkyl or alkoxy radical and X is an atom of sulphur or oxygen.

In Table I below the phosphorus acids used in the processes of Examples 2–13 are identified simply by reference to the nature of the groups R, $R_1$ and X

TABLE I

| Example No. | R | $R_1$ | X | Physical Constants |
|---|---|---|---|---|
| 2 | $CH_3$ | $C_2H_5O$ | O | $n_D^{21}$ 1.4876. |
| 3 | $CH_3$ | $CH_3O$ | S | B.P. 130–3/0.002 mm. Hg. |
| 4 | $CH_3$ | $C_2H_5O$ | S | B.P. 124–130/0.003 mm. Hg $n_D^{23}$ 1.5384. |
| 5 | $C_2H_5$ | $C_2H_5$ | S | Undistilled liquid. |
| 6 | $CH_3$ | $n$-$C_4H_9O$ | S | Do. |
| 7 | $CH_3$ | $CH_3O$ | O | Do. |
| 8 | $CH_3$ | $n$-$C_5H_{11}O$ | O | Do. |
| 9 | $CH_3$ | $n$-$C_4H_9O$ | O | Do. |
| 10 | $C_2H_5$ | $C_2H_5$ | O | Do. |
| 11 | $CH_3O$ | $CH_3O$ | S | Undistilled liquid $n_D^{21}$ 1.5326. |
| 12 | $n$-$C_4H_9O$ | $n$-$C_4H_9O$ | S | Undistilled liquid $n_D^{21}$ 1.5028. |
| 13 | $C_2H_5O$ | $C_2H_5O$ | O | Undistilled liquid $n_D^{21}$ 1.4840. |

EXAMPLES 14–16

Several other lactone derivatives of phosphorus thiolic acids (Examples 14–16) have been prepared by the general process of Example 1, but using the appropriate lactone in place of β-angelica lactone, and using the appropriate phosphorus acid.

The substances obtained as products of these examples are believed to have the general formula:

$$\begin{array}{c} R \diagdown \quad \nearrow S \\ P \\ R \diagup \quad \diagdown S-A \end{array}$$

where R is a lower alkoxy radical and A is a gamma or delta lactone residue, and they are identified in Table II by reference to the groups R and A.

TABLE II

| Example No. | R | A |
|---|---|---|
| 14 | $CH_3O$ | $\begin{array}{c}CH_3 \\ -\!\!\!-\!\!\!-\!\!CHCH_3 \\ O \quad\;\; | \\ \| \quad\;\; O \\ CH_3C \diagdown \; \diagup \\ \qquad C \\ \qquad \| \\ \qquad O \end{array}$ |
| 15 | $CH_3O$ | $\begin{array}{c} \qquad\;\; COCH_3 \\ CH_3 \diagdown \;\;| \\ \quad\;\;\; \diagdown \;\;|\!\!=\!\!O \\ \quad\;\;\;\;\; \diagup \;\; O \\ \quad\;\; \diagup\!\!\diagdown \\ CH_3 \;\; CH_3 \end{array}$ |
| 16 | $C_2H_5O$ | Same as above. |

What we claim is:
1. β - Methoxy(methyl)phosphinothioylthio - γ-valero-lactone.
2. β-Ethoxy(methyl)phosphinylthio-γ-valerolactone.
3. β-n-Butoxy(methyl)phosphinylthio-γ-valerolactone.
4. β-Diethylphosphinylthio-γ-valerolactone.

References Cited

UNITED STATES PATENTS

| 2,995,576 | 8/1961 | Kogan et al. | 260—343.6 |
| 3,014,925 | 12/1961 | Linn et al. | 260—343.5 |
| 2,934,471 | 4/1960 | Stansbury | 167—33 |
| 2,974,084 | 3/1961 | Mayhew et al. | 167—33 |
| 3,413,318 | 11/1968 | Baker | 260—343.6 |
| 3,432,599 | 3/1969 | Hackmann | 260—343.2 |

FOREIGN PATENTS

| 510,817 | 5/1952 | Belgium. |
| 912,918 | 12/1962 | Great Britain. |

JAMES A. PATTEN, Primary Examiner

U.S. Cl. X.R.

260—343.5; 424—203